Nov. 29, 1960  H. U. KIRCHHOFER  2,961,739
TURRET LATHE
Filed April 8, 1957  4 Sheets-Sheet 1
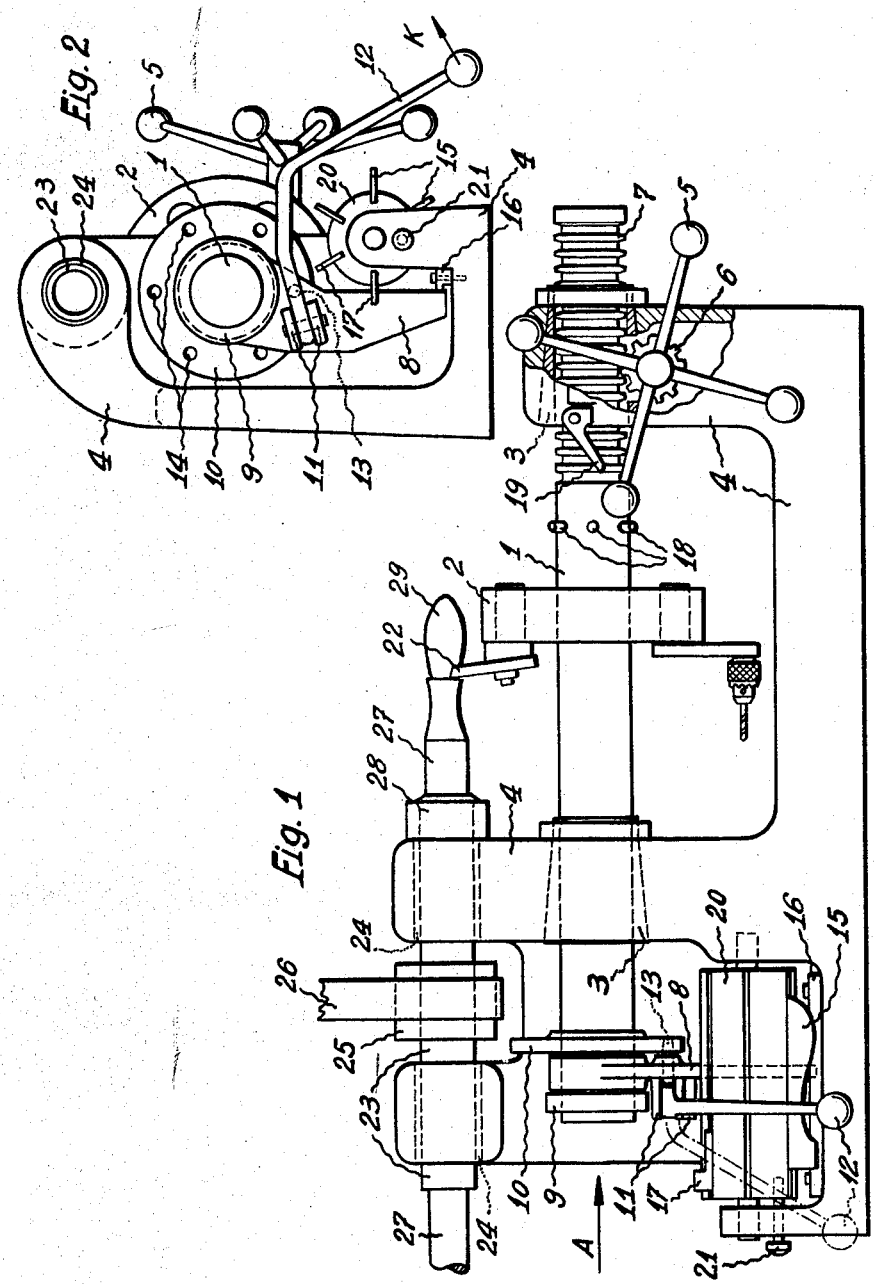

Nov. 29, 1960     H. U. KIRCHHOFER     2,961,739
TURRET LATHE
Filed April 8, 1957     4 Sheets-Sheet 2
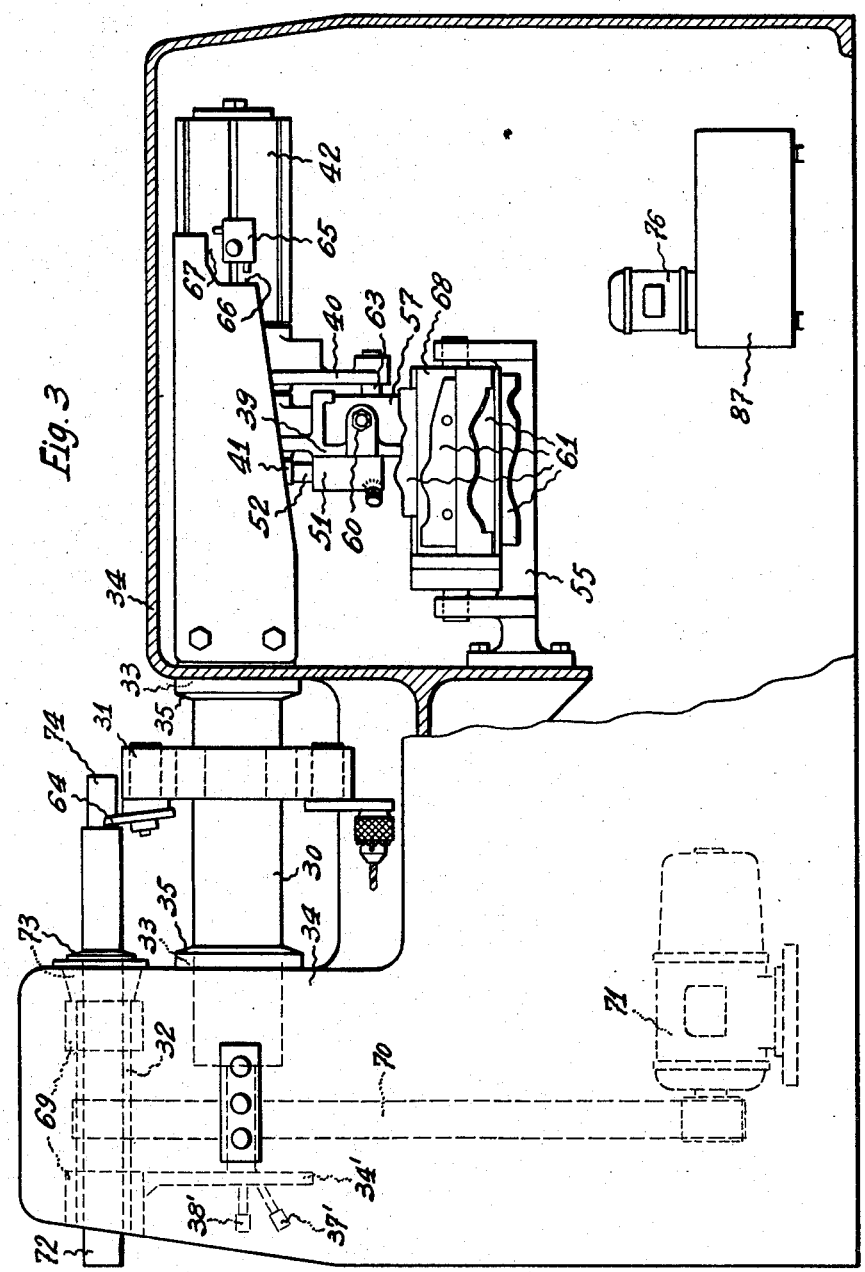

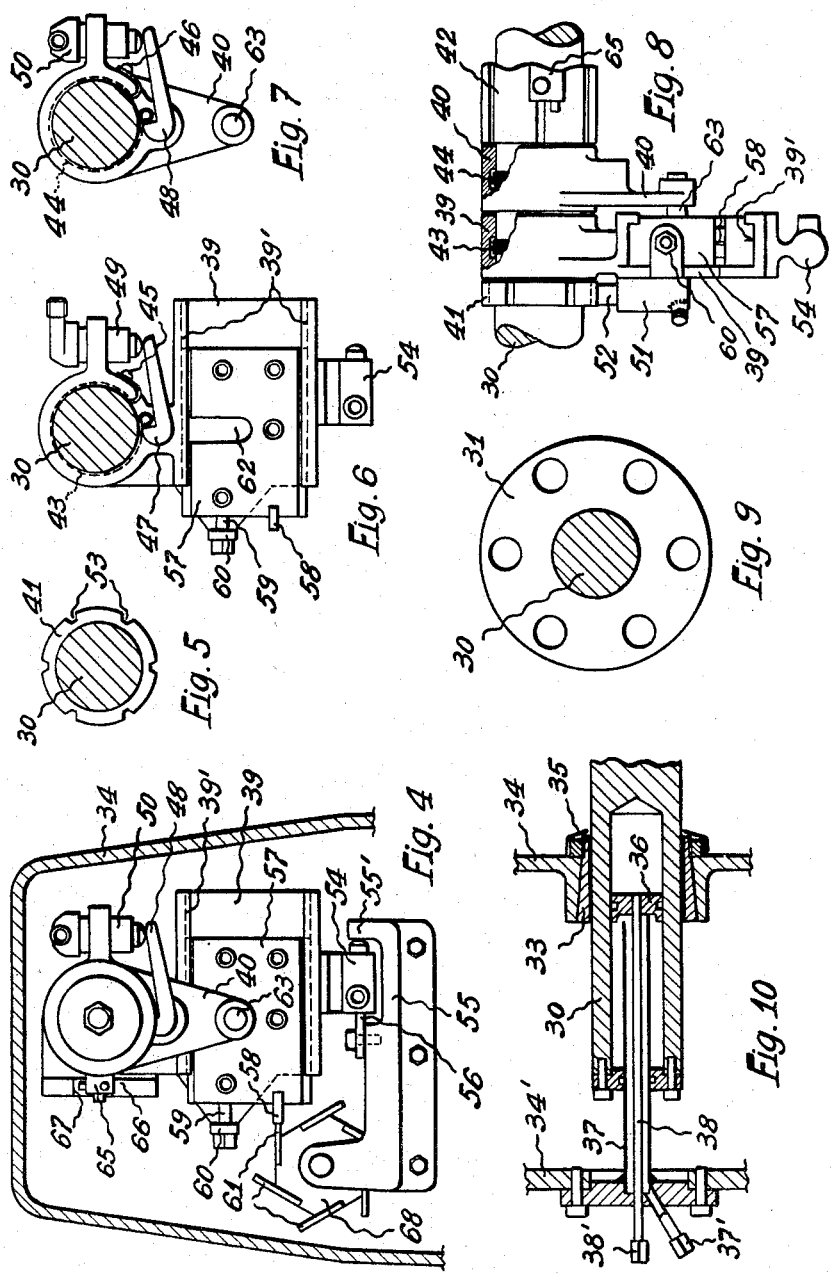

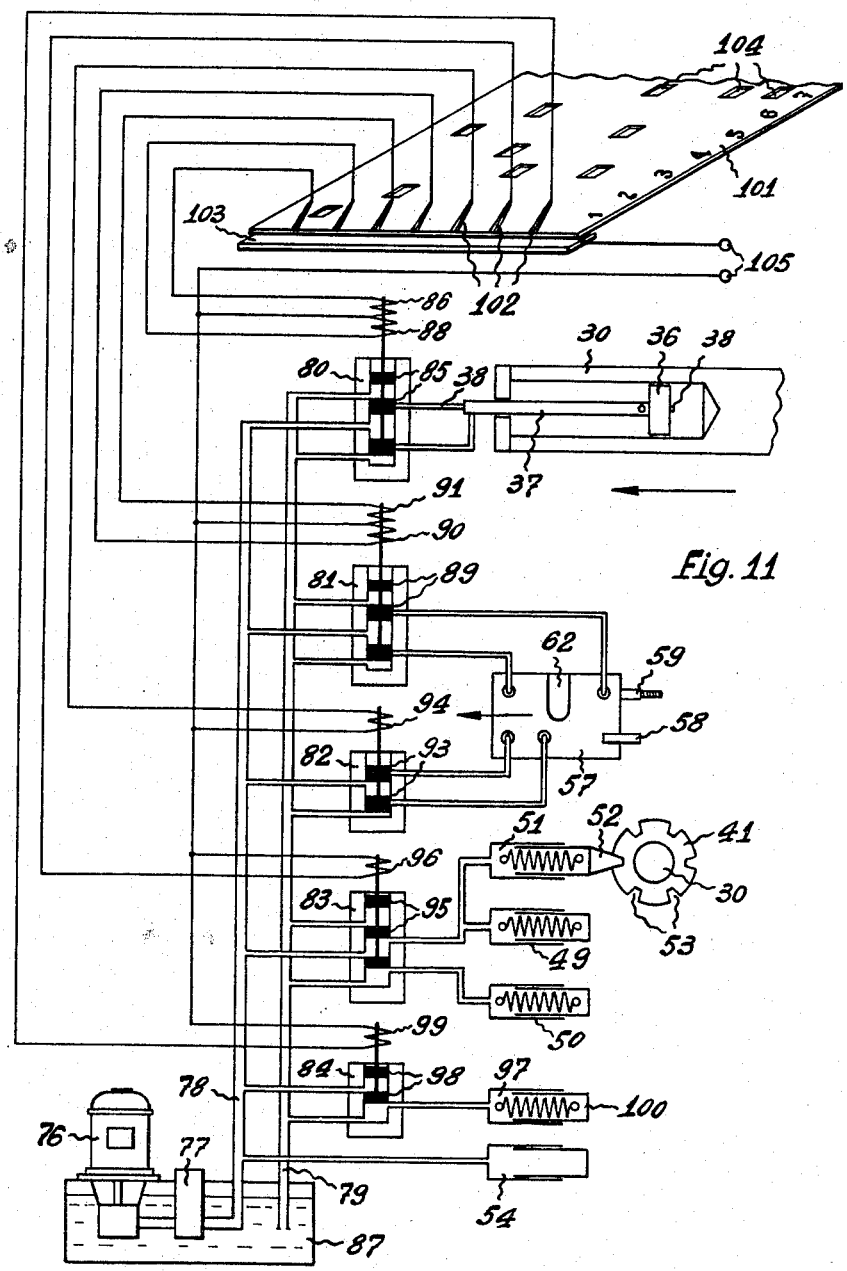

United States Patent Office 2,961,739
Patented Nov. 29, 1960

2,961,739
TURRET LATHE

Hans Ulrich Kirchhofer, Pfarrhausgasse 4, Meilen, Zurich, Switzerland

Filed Apr. 8, 1957, Ser. No. 651,426

Claims priority, application Switzerland Feb. 13, 1957

5 Claims. (Cl. 29—46)

Designs of turret lathes are known in which the turret axle is arranged parallel to the axis of the work spindle and in which the turret is arranged rotatable about a slide cylindrical on its periphery, or rotatable on an ordinary bed slide. In such cases the tools are arranged in the turret in axial direction.

With such turret lathes, shaping operations can be carried out by rotating the turret head during the longitudinal feed of the slide moving on a guideway, or parting-off operations by rotating the turret head with the slide at rest. But for rotating the turret, this type of construction requires a sliding connection of the turret to the slide, a connection encumbered with running play, and the slide for its part, in order to be moved longitudinally, is connected to the machine bed through a sliding guide again encumbered with running play.

Such turret lathes can only be made accurately at a relatively great expense, since the running plays and the inaccuracies of the two sliding connections add together.

Further, it is also known to arrange a turret rigidly on one end of a cylindrical shaft, running parallel to the axis of the working spindle and with its other end carried rotatable and longitudinally displaceable in the stand of the machine. The tools are arranged in the turret in the axial direction, and each tool is attached to a separate arm projecting in the radial direction. The guiding of the turret in the longitudinal direction in each of the working positions is attained through one of the radial arms connected rigidly to the cylindrical shaft, by cooperating with a guiding bar fitted on the machine stand and directed parallel to the axis of the working spindle in such a way that, during the longitudinal feed this guiding bar slides in a guide bush provided at the outer extremity of each arm.

Without slides and bed guides, this type of guiding allows the radial arms of the turret—and thereby simultaneously the tool—to be guided parallel to the axis of the working spindle during the machining operations. However, a rotating motion of the shaft with the tool carrier in order to shape or to part-off workpieces is rendered impossible by this arrangement; for these operations, additional separate cross-slides must be provided.

Further, constructions have been made known in which a cylindrical bush is carried rotatable and longitudinally displaceable on one end of a cylindrical shaft directed parallel to the axis of the working spindle, the other end of this shaft being fixed in the stand of the machine. On this sliding bush a tool carrier is arranged, which may be considered as a small section of a drum-turret, and which is guided in longitudinal and transverse directions by an arm connected rigidly to the bush, this arm being each time supported on a separate rotating template stepped to suit the turret indexing.

This method of construction has the great drawback that only a restricted portion of circular arc can be controlled when the feeler arm is rigidly connected to the bush and the templates are rotating. For this reason, it is impossible to effect a full turn of the bush and of the tool carrier rigidly connected to it. This is therefore not a turret lathe, and therefore only a relatively small number of tools can be provided.

The present invention now shows a way of being able to avoid these drawbacks.

The present invention relates to a turret lathe with turret axis arranged parallel to the axis of the working spindle and with the turret longitudinally displaceable and rotatable, which turret is fixed rigidly on a longitudinal, cylindrical shaft carried rotatable and longitudinally displaceable in the machine stand, whereby to the shaft at least one arm is connected, which guides the shaft and thereby the tool during the longitudinal feed, and is characterised in that the arm is detachably connected to the shaft in such a way that the turret can be rotated with respect to the arm in order to move into the next tool position, and that the shape to be turned can be obtained by means of the arm from a template contacted at one side.

Since the arm is detachably connected to the shaft, this one arm can undertake the guiding of the shaft in each tool position and in particular effect the straight guiding for all drilling and cylindrical turning operations by contacting with one single, stationary template in the form of a straightedge. Consequently therefore, neither separate arms for each tool position are required, nor separate or rotating templates for each single drilling or cylindrical turning operation. From this there results a simplifying in the construction of the machine and a considerable saving in space required and in cost. Further, if the turret is arranged between the two bearings of the shaft, the inaccuracies caused by bearing play and transmitted to the shaft will be much reduced in comparison with those in the known constructions.

Two embodiments of the subject of the invention are fully explained by way of example with reference to the accompanying drawings, where:

Fig. 1 shows an elevation of a first machine from the front,

Fig. 2 a view of the machine from the side A in Fig. 1,

Fig. 3 an elevation of a second machine, with casing partly broken away,

Fig. 4 a view of the machine observed from the right in Fig. 3, the casing being broken away, Fig. 5 the index plate, Figs. 6 and 7 two details seen in the axial direction of the shaft, Fig. 8 these two details assembled together, seen transverse to the axial direction,

Fig. 9 the turret,

Fig. 10 a longitudinal section through the end of the cylindrical shaft situated at the left in Fig. 3, and Fig. 11 a diagrammatic arrangement of an hydraulic-electric control equipment of this second machine.

According to Figs. 1 and 2, a turret or tool carrier 2 is rigidly fixed on a cylindrical shaft 1. The cylindrical shaft 1 is arranged parallel to a working spindle 23 and carried longitudinally displaceable and at the same time rotatable in two adjustable bearings 3 in the machine stand 4, the turret 2 being arranged between the two bearings 3. The longitudinal feed of the shaft 1 is effected through a toothed wheel 6 cooperating with the cross-handle 5, the wheel 6 engaging into a toothed-rack profile 7. This toothed-rack profile extends over the whole cylindrical periphery of the shaft 1 and thus makes it possible to rotate the shaft 1, even during feed. Further, on the shaft 1 an arm 8 is carried freely rotatable and is prevented from moving axially by a ring 9 at one side of it and the index plate 10 at the other side. For this purpose the ring 9 and the index plate 10 are rigidly connected to the shaft 1. At 11 on the arm 8 a handlever 12 is rotatably mounted. In the position shown with full lines in Fig. 1 the lever 12 acts on a locking bolt 13, carried longitudinally movable in the arm 8, and presses it into a suitable hole 14 in the index plate 10 (see Fig. 2). In this manner, the arm 8 and the shaft 1 are locked relatively to each other in a definite position, which can be repeated as often as desired and with the same accuracy. In the position of the handlever 12 shown in dash-dotted lines in Fig. 1, the locking bolt 13 is withdrawn from the hole 14 of the index plate 10. Thus arm 8 and shaft 1 can rotate relatively to each other, for instance for changing the tool position. With the same dividing, the index plate 10 has as many holes 14, as the turret 2 has bores in which tools may be held.

In the position of the handlever 12 in which the shaft 1 and the arm 8 are locked relatively to each other, the shaft 1 is guided in the longitudinal direction as follows: with the handlever 12 an external force K (see Fig. 2), is transmitted to the arm 8 in such a way that the free end of that arm is always supported at one side against a template 15 or 16 corresponding to the contour of the workpiece. The templates 15 are profiled and the template 16 is formed as a straightedge. Now if the shaft 1 is moved in its longitudinal direction by the turning of cross-handle 5, the free end of the arm 8 is continuously supported against other places of the template 15 or 16 and in this manner follows the contour of that template.

By the contacting of a profiled template 15, a lateral deflecting of the arm 8 is effected. In this way a rotating motion of the shaft 1 is caused and consequently also of the turret 2 with the tool 22 fixed in it, so that shaping or parting-off operations can be carried out. By the contacting with the template 16, the arm 8 is guided parallel to the axis, so that drilling and cylindrical turning operations are made possible. One straight template 16 is sufficient for all drilling and cylindrical turning operations; it is rigidly connected to the machine stand 4 in an adjustable manner.

For limiting the longitudinal feed, as well as for parting-off operations, end stops 17 provided with vertical shoulders are arranged on the template carrier 20.

When changing the tool position, the turret 2 must be rotated through one division of the index plate 10. This is effected by bringing the handlever 12 into the position represented in Fig. 1 in dash-dotted lines and by moving the shaft 1 backwards with the cross-handle 5 until one of the pins 18 fixed on the shaft 1 has run onto a pawl 19, fixed on the machine stand 4, and has in this manner rotated the shaft 1 through approximately one division. When shaft 1 is moved forward, the pawl 19 is raised by the pin 18 situated directly underneath it and then falls back again into the position of rest illustrated in Fig. 1. The number and spacing of the pins 18 corresponds to those of the holes 14 in the index plate 10 and of the tool bores in the turret 2.

Simultaneously with the changing of the tool position, also a corresponding changing of the templates 15 or of the stops 17 generally takes place. For this purpose the template carrier 20 is rotated through one division and again secured in its new position by a locking bolt 21.

The work spindle 23 is carried in two bearings 24 in the machine stand 4 and is driven through a pulley 25 by the belt 26. The work spindle 23 is bored through longitudinally in order to be able to introduce bar stock, and possesses at its front end a clamping device 28, with which the introduced bar stock 27 can be brought into operative engagement with the work spindle 23. Fig. 1 shows how one can make from the bar stock 27 a turned piece 29 corresponding to the template 15 shown below on the template carrier in Fig. 1.

According to another embodiment (not illustrated), the longitudinal feed can be effected by the shaft 1 being constructed in known manner as cylinder or as piston of an hydraulic feed unit. Also the combined function of the handlever 12 may be divided into separate functions, whereby these separate functions may also be carried out by generally known hydraulic power means.

The second turret lathe, described with reference to Figs. 3–11, is actuated through an hydraulic system, is equipped with an hydraulic copying device, and is particularly suitable for semi-automatic and fully automatic service.

The turret 31 is rigidly fixed on a cylindrical shaft 30. The cylindrical shaft 30 is arranged parallel to a work spindle 32 and is carried, longitudinally displaceable and at the same time rotatable, in two adjustable bearings 33 in the machine stand 34, the turret 31 being arranged between the two bearings 33. By means of covering caps 35 the bearings 33 are protected against the entry of dirt. At its left end as seen in Fig. 3, the shaft 30 is designed as hydraulic cylinder for a piston 36 to which pressure oil can be admitted at either side (Fig. 10). Through a hollow piston rod 37, the piston 36 is connected to an intermediate partition 34' inside the machine stand 34. The lefthand cylinder space is connected to a pressure-oil system through the hollow piston rod 37 and by the connection 37'. The righthand cylinder space is in connection with a pipe 38, arranged within the hollow piston rod 37 and connected to the pressure-oil system through the connection 38'. The cylinder bore is arranged concentric in the shaft 30, so that the latter can be moved longitudinally and rotated when in any position. The longitudinal feed of the shaft 30 is effected by pressure oil being led to the lefthand cylinder space through the connection 37', and by the oil forced out of the righthand cylinder space being at the same time led away through the pipe 38. The return travel of the shaft 30 is effected by reversed control of the flow of pressure oil.

Further, on the shaft 30 two cooperating arms 39 and 40 are carried freely rotatable, which are prevented from moving axially by the index plate 41 on one side and by a stop carrier 42 on the other side (Fig. 8). The index plate 41 and the stop carrier 42 are rigidly connected to the shaft 30.

The two arms 39 and 40 cooperate in such a way that the arm 39 has only the function of straight guiding and the arm 40 only the function of rotating the shaft 30. For this purpose the arms can be brought into operative engagement with the shaft. This is effected as follows: a band 43 or 44 laid round the shaft 30 is firmly connected to the arm at one end at 45 or 46 respectively, and at the other end tightened peripherally by a two-armed lever 47 or 48 respectively, the lever being actuated by an hydraulic cylinder 49 or 50 respectively. It is however also possible to adopt other means for bringing the arms into operative connection with the shaft.

In the case of drilling and cylindrical turning, an index pin 52—arranged radially to the shaft 30 and carried in an hydraulic cylinder 51—seats firmly in a suitable notch 53 on the periphery of the index plate 41 (Fig. 8). Thus the arm 39 and the shaft 30 are locked relatively to each other in a definite position, which can be repeated with the same accuracy as often as desired. By an hydraulic pressing cylinder 54 (Fig. 4) whose piston is supported against a guide edge 55' of a bracket 55 fixed on the machine stand 34, the free end of the arm 39 is pressed at one side onto a straightedge 56 adjustably fixed in the bracket 55, thus making possible an accurate straight guiding of the shaft 30. In order that the cutting forces may not stress the indexing device and adversely influence its accuracy, the arm 39 is directly brought into operative engagement with the shaft 30 in the manner described above by tightening the band 43, so that the indexing device is relieved from the cutting forces.

Because the arm 39 always remains in the same position with respect to the straightedge 56 and/or machine stand 34, this arm is constructed as carrier of the power-operated index pin 52 and of a control block 57 of the copying device. The copying device consists of an hydraulic feeler 58 working in known manner and of an hydraulic cylinder with piston to which oil can be admitted at either side, the two being combined to form the control block 57. The piston rod 59 of the double-acting piston passes out of the control block 57 and is rigidly connected to the arm 39 at 60. If, now, the control block 57 is guided by the described longitudinal feed along a template 61 or a specimen piece, the feeler 58 is moved in accordance with the contour of the template or specimen piece and controls the admission of pressure oil to the corresponding piston-side of the hydraulic cylinder in the control block 57. This last moves transverse to the feed direction in a guideway 39' provided on the arm 39, until the deviation of the feeler 58 from its basic position has again been brought back to nil. Further, the control block 57 has a slideway 62 (Fig. 6) which cooperates with the free end 63 of the arm 40 in such a way that any movement of the control block 57 positively leads to a corresponding rotation of the arm 40 carried on the shaft 30.

During copying operations the arm 40 is operatively connected to the shaft 30; the index pin 52 is withdrawn from the notch 53, and the arm 39 is free to rotate on the shaft 30. Through the movement of the feeler 58 during the longitudinal feed, the control block 57 moves in the manner described. Thus, through the arm 40 operatively connected to the shaft 30, the shaft itself and consequently the turret 31 along with the tool 64 is rotated through an amount determined by the template or specimen piece. In this way, as many congruent turned pieces as desired may be produced from template or specimen piece.

In the case of parting-off operations and in-feed, the shaft 30 is first of all moved in its longitudinal direction until a stop 65—set suitably on the stop carrier 42 rigidly connected to the shaft 30—runs against the longitudinal stop-face 66 (Fig. 3), and in this manner interrupts the longitudinal feed of the shaft 30. Then pressure oil is admitted to the feeding side of the piston in the hydraulic cylinder of the control block 57 and in this manner the shaft 30 along with the turret 31 is rotated so far until the set stop 65 comes against the transverse stop-face 67, and in this manner interrupts the further transverse feed of the shaft 30. On the stop carrier 42, the stops 65 can be arranged adjustable longitudinally and transversely.

When changing the tool position, the turret must be rotated through one division of the index plate 41. For this purpose the index pin 52 is withdrawn from its notch 53, the operative connection between arm 39 and shaft 30 is disengaged, and arm 40 is brought into operative connection with shaft 30. Then, as when parting-off, pressure oil is admitted to the feed side of the piston in the hydraulic cylinder of the control block 57, and in this manner the shaft together with the turret is rotated approximately through one division. By the engaging of the index pin 52 into the next notch 53 and the operative connecting of the arm 39 to the shaft 30, the latter is locked in its new position. After loosening the connection between shaft 30 and arm 40, the latter is returned again to its initial position by the control block 57.

Simultaneously with the tool change, a template change is also generally effected. For this purpose a template holder 68 is rotated through one division and locked in its new position, which functions can be fulfilled in known manner by means of the mechanical and hydraulic systems.

The work spindle 32 (Fig. 3) is carried in the machine stand 34 in two bearings 69 and is driven by the motor 71 through a belt 70. The work spindle is bored through in its longitudinal direction in order to be able to pass bar stock through it, and at its front end it has a clamping device 73 with which the introduced bar stock 72 can be brought into operative connection by the work spindle 32. Fig. 3 shows how a cylindrical turned piece 74 is produced from the bar stock 72.

In the following, the method of working of the lathe according to Figs. 3–10 is explained with reference to the control equipment illustrated diagrammatically in Fig. 11. The parts represented in Figs. 3–10 are given the same reference numerals in this diagram. The pump 76 delivers oil through a relief-pressure valve 77 at a certain pressure into the delivery piping 78, to which electromagnetic control valves 80, 81, 82, 83 and 84 are connected in parallel, these valves being shown in the positions occupied when without current.

The feed cylinder of the shaft 30 is connected to the control valve 80, which is designed as 4-way valve. If the control piston 85 is pushed downwards by the magnet coil 86, pressure oil flows out of the piping 78 into the lefthand cylinder space, so that the shaft 30 is moved forward in the direction of the arrow. The oil in the righthand cylinder space is led by the pipe 38 through the control valve 80 into the collecting-return piping 79 and into the sump 87. In order to regulate the speed of the feed, a regulating valve can be fitted in the pipe 38. If the control piston 85 is raised by the magnet coil 88, pressure oil flows out of the piping 78 through the pipe 38 into the righthand cylinder space, so that the shaft 30 is moved in a direction contrary to that of the arrow. The oil in the lefthand cylinder space is led by the hollow piston rod 37 through the control valve 80 into the collecting-return piping 79 and into the sump 87.

The hydraulic cylinder of the control block 57 is connected to the control valve 81 which is designed as 4-way valve. If the control piston 89 is pushed downwards by the magnet coil 90, pressure oil flows out of the delivery piping 78 into the lefthand cylinder space, so that the control block 57 is moved in the direction of the arrow. The oil in the righthand cylinder space then flows through the control valve 81 into the collecting-return piping 79 and into the sump 87. If the control piston 89 is raised by the magnet coil 91, the pressure oil then flows out of the piping 78 into the righthand cylinder space, so that the control block 57 is moved contrary to the direction of the arrow. The oil in the lefthand cylinder space then flows through the control valve 81 into the collecting-return piping 79 and into the sump 87.

The copying feeler 58 of the control block 57 is connected to the control valve 82. If the control piston 93 is raised by the magnet coil 94, pressure oil flows out of the piping 78 to the copying feeler 58 and is directed by this feeler into the lefthand or righthand cylinder space of the hydraulic cylinder in the control block 57, in accordance with the movement of the feeler as determined by the template 61. The displaced quantity of oil flows through the control valve 82 into the collecting-return piping 79 and into the sump 87. In their position corresponding to the state without current, the control valves 80, 81 and 82 prevent the pressure oil from flowing through to the consumers, as well as the return flow of oil from the consumers into the collecting-return piping.

To the control valve 83, the hydraulic cylinders 49, 50 and 51 are connected, the cylinders 49 and 51 being arranged in parallel. In the position of the control piston 95 corresponding to the state without current, pressure oil is admitted to the cylinders 49 and 51 and the cylinder 50 is connected to the collecting-return piping 79. If the control piston 95 is pushed downwards by the magnet coil 96, pressure oil flows to cylinder 50, and the cylinders 49 and 51 arranged in parallel are connected to the collecting-return piping 79.

An hydraulic cylinder 97 is connected to the control valve 84. If the control piston 98 is pushed downwards by the magnet coil 99, pressure oil flows out of the piping 78 to the cylinder 97 and moves a piston 100 to the right. Thus the changing mechanism of the template holder 68 is actuated and rotates the latter through one template division.

When the hydraulic cylinders 49, 50, 51 and 97 are connected to the collecting-return piping 79, the pistons carried in these cylinders are drawn entirely into the cylinders by fitted tension springs.

The pressing cylinder 54, which keeps the free end of the arm 39 always pressed against the straightedge 56, is directly connected to the delivery piping 78 without any control member.

The flow of electric current through the magnet coils of the control valves is controlled by a pattern card 101. Corresponding to the program to be controlled, this pattern card 101 has holes 104 and is moved along in steps. Through the holes 104 contact brushes 102 can touch a contact rail 103, and in this manner close the desired electric circuit. The step-wise movement of the pattern card 101 can be effected in various ways. For instance, at the end-stop faces 66 and 67 contacts may be provided, which notify the terminating of the operation performed by the shaft 30 and thus start the next step of the pattern card. The operations of the hydraulic cylinders 49, 50, 51 and 97 always require about the same time. In that case, therefore, the starting of the next step of the pattern card can be controlled by time relays.

The following example illustrates the method of functioning of the lathe when actuated hydraulically and controlled by the electromagnetic valves and by means of the pattern card 101.

The previously prepared pattern card 101 is laid between the contact brushes 102 and the contact rail 103 (Fig. 11), and the rail is connected at 105 to the electric supply system. Then the pattern card 101 is moved until the row of holes marked "1" on the card comes to lie under the contact brushes 102. In the illustrated example, first the electric circuit through the magnet coil 86 is closed, and thus the shaft 30 is moved in the direction of the arrow. When the longitudinal feed is finished, the pattern card 101 is moved forward by one row of holes. The row of holes "2," which now comes to lie under the contact brushes 102, closes the electric circuit through the magnet coil 88, whereby the shaft 30 moves back in the contrary direction to the arrow.

With these two movements of the shaft 30, drilling and cylindrical turning operations can be carried out.

Now a change of the tool position follows. The row of holes "3" closes the electric circuits through the coils 90 and 96, whereby through the cylinder 50 the arm 40 is operatively connected to the shaft 30 and simultaneously—by a pressure drop in the cylinders 49 and 51—the operative connection of arm 39 to shaft 30 is disengaged, and the index pin 52 is withdrawn from the notch 53. The control valve 81 admits pressure oil into the hydraulic cylinder of the control block 57, whereby this block is moved in the direction of the arrow. This movement is followed positively by the free end 63 of the arm 40 collaborating with the slideway 62, so that the arm 40 rotates the shaft 30 along with the turret 31 through one division of the index plate 41.

After another step of the pattern card 101, the row of holes "4" lies under the contact brushes 102, so that only the electric circuit through coil 91 is closed. The cylinders 49 and 51 receive pressure oil, since the control piston 95—when the coil 96 is without current—automatically moves back into the position illustrated in Fig. 11. The index pin 52 is therefore pressed into a notch 53 of the index plate 41, and the arm 39 is operatively connected to the shaft 30. Simultaneously, in consequence of pressure drop in the cylinder 50, the operative connection of arm 40 to shaft 30 is disengaged and the control valve 81 directs pressure oil into the hydraulic cylinder of the control block 57, in such a way that this block is moved in a direction contrary to that shown by the arrow and the arm 40 is again brought back into its initial position.

A tool change is thus finished and a copying operation shall follow. The row of holes "5" closes the electric circuits through the coils 86 and 94, whereby the shaft 30 is pushed forward in the described manner in the direction of the arrow, and the copying feeler 58—now connected to the pressure oil piping 78—produces the rotating movement of the shaft 30, that is to say the transverse feed, in accordance with the contour of the template 61.

When the copying operation has finished, the row of holes "6" causes through the coil 88 the return movement of the shaft 30, after which the row of holes "7" starts a change of the tool position in the manner described for the row of holes "3," and in addition—by closing the electric circuit through the coil 99—moves the piston 100, whereby a template change is started.

By suitably combining the described possibilities of control, the different sequences of operations can be performed automatically on this lathe in a simple manner.

What I claim is:

1. In a turret-lathe having a frame, in combination, a rotatably driven work-holding spindle for holding a workpiece, fixed bearings on said frame, a shaft longitudinally movable, rotatably mounted in said bearings and arranged parallel to said spindle, a turret rigidly fixed on said shaft for rotation and axial travel therewith and having a plurality of tool mounting positions angularly spaced at equal intervals for mounting a plurality of cutting tools thereon, an indexing device for setting the turret, means to rotate the shaft for indexing the turret and placing the tools alternatively in working relation with the workpiece, a follower arm mounted rotatably on said shaft and extending radially therefrom and positionable angularly with respect thereto, means selectively operable to restrain the arm from rotation relative to the shaft and rigidly fixing it thereon in distinct positions, tracer means connected to the free end of said follower arm, means for mounting a template in position to be scanned by said tracer means to angularly rotate and guide the shaft rotationally in correspondence with the shape of the template during axial displacement of the shaft thereby to displace a tool in working relation to the workpiece and control its movements transversely and longitudinally of the workpiece in correspondence with the template, and said distinct angular position of the arm being so chosen so that said arm constitutes guiding means for whichever of the tools is in working relation with said workpiece.

2. In a turret-lathe having a frame, in combination, a rotatably driven work-holding spindle for holding a workpiece, fixed bearings on said frame, a shaft longitudinally movable, rotatably mounted in said bearings and arranged parallel to said spindle, a turret rigidly fixed on said shaft for rotation and axial travel therewith and having a plurality of tool mounting positions angularly spaced at equal intervals for mounting a plurality of cutting tools thereon, an indexing device for setting the turret, means to rotate the shaft for indexing the turret and placing the tools alternatively in working relation with the workpiece, a follower arm mounted rotatably on said shaft and extending radially therefrom and positionable angularly with respect thereto, means selectively operable to restrain the arm from rotation relative to the shaft and rigidly fixing it thereon in distinct angular positions, means for mounting a template in position to be scanned by said arm to guide the shaft rotationally in correspondence with the shape of the template during axial displacement of the shaft thereby to displace a tool in working relation to the workpiece and control its movements transversely and longitudinally of the workpiece in correspondence with the template, said distinct angular positions of the arm being so chosen so that said arm constitutes guiding means for whichever of the tools is in working relation with said workpiece, and means operable to quickly change the angular poistions of said arm with respect to said turret.

3. In a turret-lathe having a frame, in combination, a rotatably driven work-holding spindle for holding a workpiece, fixed bearings on said frame, a shaft longitudinally movable, rotatably mounted in said bearings and arranged parallel to said spindle, a turret rigidly fixed on said shaft and having a plurality of tool mounting positions angularly spaced at equal intervals for mounting a plurality of cutting tools thereon, an indexing device for setting the turret, means to rotate the shaft for indexing the turret and placing the tools alternatively in working relation with the workpiece, a follower arm mounted rotatably on said shaft and extending radially therefrom and positionable angularly with respect thereto, means operable selectively to restrain the arm from rotation relative to the shaft and rigidly fixing it thereon in distinct angular positions, tracer means reciprocably mounted and connected to the free end of said follower arm, means for mounting a template in position to be scanned by said tracer means to angularly guide the shaft in correspondence with the shape of the template during axial displacement of the shaft thereby to displace a tool in working relation to the workpiece and control its movements transversely and longitudinally of the workpiece in correspondence with the template, and said distinct angular positions of the arm being so chosen so that said arm constitutes guiding means of the tool head for whichever of the tools is in working relation with said workpiece.

4. In a turret-lathe having a frame, in combination, a rotatably driven work-holding spindle for holding a workpiece, fixed bearings on said frame, a shaft longitudinally movable, rotatably mounted in said bearings and arranged parallel to said spindle, a turret fixed on said shaft and having a plurality of tool mounting positions angularly spaced at equal intervals for mounting a plurality of cutting tools thereon, an indexing device for setting the turret, means to rotate the shaft for indexing the turret and placing the tools alternatively in working relation with the workpiece, a follower arm mounted rotatably on said shaft and extending radially therefrom and positionable angularly with respect thereto, means operable selectively to restrain the arm from rotation relative to the shaft and rigidly fixing it thereon in distinct angular positions, tracer means comprising a cross-slide guiding the free end of said follower arm, a second arm extending radially of the shaft for slidably supporting the cross-slide, and means for mounting a template in position to be scanned by said cross-slide to guide the shaft rotationally in correspondence with the template during axial displacement of the shaft thereby to displace a tool in working relation to the workpiece and control its movements transversely and longitudinally of the workpiece in correspondence with the template, and said distinct angular positions of the follower arm being so chosen so that said follower arm constitutes guiding means for whichever of the tools is in working relation with said workpiece.

5. In a turret-lathe having a frame, in combination, a rotatably driven work-holding spindle for holding a workpiece, fixed bearings on said frame, a shaft longitudinally movable, rotatably mounted in said bearings arranged parallel to said spindle, a turret fixed on said shaft and having a plurality of tool mounting positions angularly spaced at equal intervals for mounting a plurality of cutting tools thereon, an indexing device for setting the turret, means to rotate the shaft for indexing the turret and placing the tools alternatively in working relation with the workpiece, a follower arm mounted rotatably on said shaft and extending radially therefrom and positionable angularly with respect thereto, means operable to restrain the arm from rotation relative to the shaft and rigidly fixing it thereon in distinct angular positions, tracer means comprising a cross-slide guiding the free end of said follower arm, a second arm extending radially of the shaft for slidably supporting the cross-slide, means for adjustably securing the second arm on the shaft and for disengaging the second arm from the shaft, and means for mounting a template in position to be scanned by said cross-slide to rotationally guide the shaft in correspondence with the template during axial displacement of the shaft thereby to displace a tool in working relation to the workpiece and control its movements transversely and longitudinally of the workpiece in correspondence with the template, and said distinct angular positions of the first-mentioned arm being so chosen so that said first-mentioned arm constitutes guiding means for whichever of the tools is in working relation with said workpiece.

References Cited in the file of this patent

UNITED STATES PATENTS

| | | |
|---|---|---|
| 674,177 | Von Pittler | May 14, 1901 |
| 1,938,050 | Smith | Dec. 5, 1933 |
| 2,407,512 | Petzold | Sept. 10, 1946 |
| 2,695,543 | Von Zelewsky | Nov. 30, 1954 |
| 2,722,151 | Layton | Nov. 1, 1955 |
| 2,777,338 | Thompson | Jan. 15, 1957 |

FOREIGN PATENTS

| | | |
|---|---|---|
| 6,579 | Great Britain | Mar. 16, 1914 |
| 697,568 | Great Britain | Sept. 23, 1953 |